US010023196B2

United States Patent
Okada et al.

(10) Patent No.: US 10,023,196 B2
(45) Date of Patent: Jul. 17, 2018

(54) CONTROL DEVICE FOR VEHICLE

(71) Applicant: Fuji Jukogyo Kabushiki Kaisha, Tokyo (JP)

(72) Inventors: Yuta Okada, Tokyo (JP); Takahiro Kinoshita, Tokyo (JP); Koichi Hirao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 41 days.

(21) Appl. No.: 15/417,065

(22) Filed: Jan. 26, 2017

(65) Prior Publication Data

US 2017/0259825 A1    Sep. 14, 2017

(30) Foreign Application Priority Data

Mar. 11, 2016    (JP) ................................. 2016-048878

(51) Int. Cl.
  *B60W 30/188*    (2012.01)
  *B60W 10/02*    (2006.01)
  (Continued)

(52) U.S. Cl.
  CPC ........ *B60W 30/1886* (2013.01); *B60W 10/02* (2013.01); *B60W 10/026* (2013.01);
  (Continued)

(58) Field of Classification Search
  CPC .. B60W 30/1886; B60W 10/30; B60W 10/02; B60W 10/026; B60W 2510/0623;
  (Continued)

(56) References Cited

U.S. PATENT DOCUMENTS

2010/0191402 A1* 7/2010 Aldrich ................. B60W 10/30
                                                          701/33.9
2012/0141297 A1* 6/2012 Jeong ....................... B60K 6/48
                                                          417/5

(Continued)

FOREIGN PATENT DOCUMENTS

JP    2004-156774 A    6/2004
JP    2004-256063 A    9/2004

(Continued)

OTHER PUBLICATIONS

Japanese Office Action in Japanese Application No. 2016-048878 dated Jun. 27, 2017 with an English translation thereof.

*Primary Examiner* — David J Hlavka
(74) *Attorney, Agent, or Firm* — McGinn IP Law Group, PLLC

(57) ABSTRACT

Provided is a control device for a vehicle including a continuously variable transmission. The control device includes a lock-up clutch, an oil pump, an electric motor, and a device control unit. The lock-up clutch is disposed in a torque converter coupled to the engine and switchable between an engaged state and a released state. The oil pump is driven by the engine and supplies a hydraulic oil to the continuously variable transmission. The electric motor is coupled to the engine and controlled to be in a powering state in which the engine is rotationally driven. The device control unit controls the lock-up clutch to put into the released state and controls the electric motor to put into the powering state if a discharge pressure of the oil pump falls below a threshold value at the time of a vehicle deceleration in which a fuel supply to the engine is cut off.

18 Claims, 10 Drawing Sheets

(51) Int. Cl.
*B60W 10/30* (2006.01)
*F16H 61/00* (2006.01)

(52) U.S. Cl.
CPC ......... *B60W 10/30* (2013.01); *F16H 61/0031* (2013.01); *B60W 2510/0623* (2013.01); *B60W 2510/108* (2013.01); *B60W 2520/04* (2013.01); *B60W 2520/105* (2013.01); *B60W 2710/021* (2013.01); *B60W 2710/024* (2013.01); *B60W 2710/1083* (2013.01)

(58) Field of Classification Search
CPC ..... B60W 2710/024; B60W 2710/021; B60W 2520/04; B60W 2520/105; B60W 2710/1083; B60W 2510/108; F16H 61/0031
See application file for complete search history.

(56) References Cited

U.S. PATENT DOCUMENTS

| | | | | |
|---|---|---|---|---|
| 2015/0088349 | A1* | 3/2015 | Akashi | B60W 10/08 701/22 |
| 2015/0283993 | A1* | 10/2015 | Takano | B60K 6/48 701/22 |

FOREIGN PATENT DOCUMENTS

| | | |
|---|---|---|
| JP | 2010-078088 A | 4/2010 |
| JP | 2013-024276 A | 2/2013 |
| JP | 2014-097707 A | 5/2014 |

\* cited by examiner

[POWER GENERATION STATE]

[DORMANT STATE]

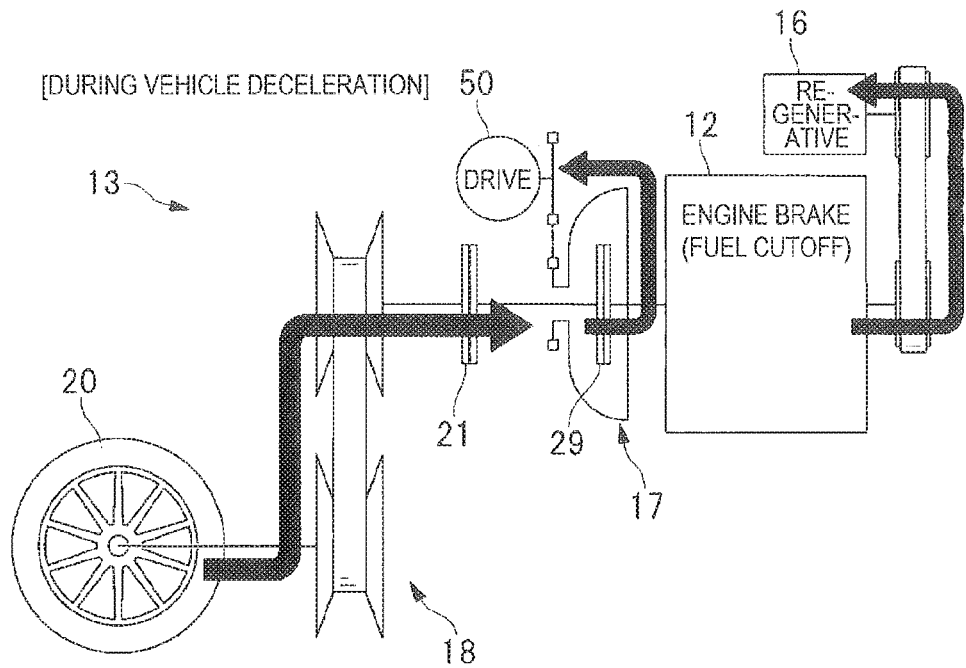
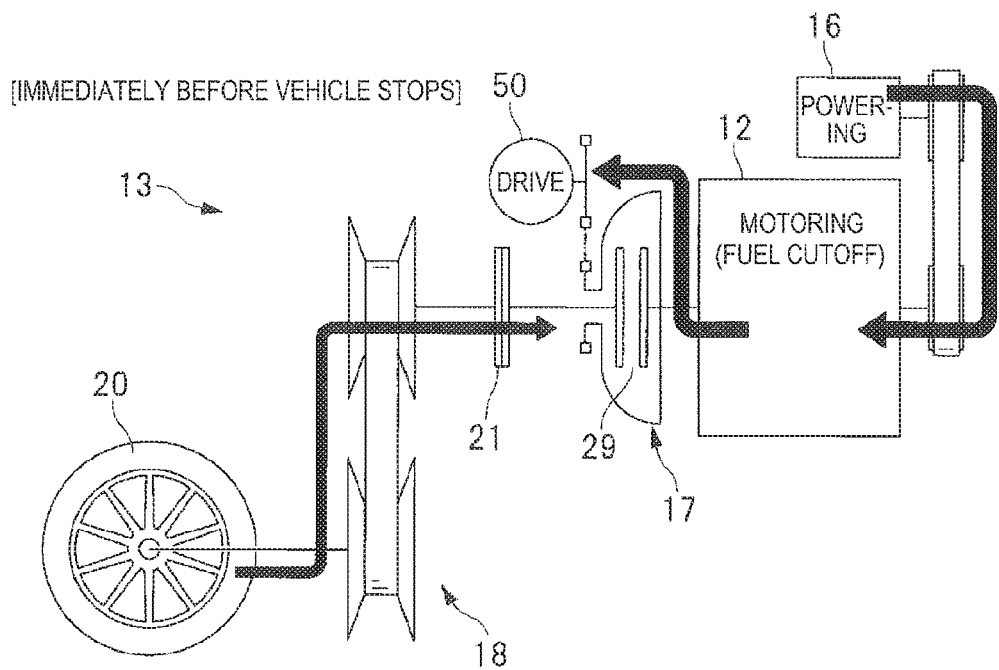

CONTROL DEVICE FOR VEHICLE

CROSS-REFERENCE TO RELATED APPLICATIONS

The present application claims priority from Japanese Patent Application No. 2016-048878 filed on Mar. 11, 2016, the entire contents of which are hereby incorporated by reference.

BACKGROUND

1. Technical Field

The present invention relates to a control device vehicle for a vehicle including a continuously variable transmission.

2. Related Art

As one of transmissions provided in a power transmission system for a vehicle, there is a continuously variable transmission in which a transmission gear ratio is continuously varied (refer to Japanese Unexamined Patent Application Publication (JP-A) No. 2010-78088 (Patent Literature 1), JP-A-2004-156774 (Patent Literature 2), JP-A-2013-24276 (Patent Literature 3)). In the continuously variable transmission of this type, a hydraulic oil is frequently supplied from an oil pump driven by an engine. In hydraulically controlling the continuously variable transmission, in order to prevent slippage of a chain or the like, there is a need to sufficiently ensure a control hydraulic pressure.

Incidentally, in order to improve a fuel performance of the vehicle, a vehicle that stops an engine before stopping has been developed. However, the engine stop before stopping the vehicle causes the oil pump to be stopped during the actuation of the continuously variable transmission, and causes a reduction in the control hydraulic pressure to slip the chain or the like. In order to protect the continuously variable transmission from such a reduction in the hydraulic pressure, the engine stop before stopping the vehicle is prohibited to hold an idling state, resulting in a need to continue the driving of the oil pump. However, the restriction of the engine stop causes a reduction in the fuel consumption performance of the vehicle.

SUMMARY OF THE INVENTION

It is desirable to protect a continuously variable transmission while improving a fuel consumption performance of a vehicle.

According to an aspect of the present invention, there is provided a control device for a vehicle including a continuously variable transmission in a power transmission path between an engine and wheels. The control includes: a lock-up clutch that is disposed in a torque converter coupled to the engine and switchable between an engaged state and a released state; an oil pump that is configured to be driven by the engine and to supply a hydraulic oil to the continuously variable transmission; an electric motor that is coupled to the engine and configured to be controlled in a powering state in which the engine is rotationally driven; and a device control unit that is capable of controlling the lock-up clutch to put into the released state and controlling the electric motor to put into the powering state if a discharge pressure of the oil pump falls below a threshold value at a vehicle deceleration in which a fuel supply to the engine is cut off. The device control unit is capable of controlling the lock-up clutch to put into the released state and controlling the electric motor to put into the powering state to rotate the engine to which the fuel supply is cut off, and drive the oil pump.

The device control unit may continuously put the electric motor into the powering state until a vehicle stops if the discharge pressure of the oil pump falls below the threshold value at the vehicle deceleration.

The control device may further include a friction clutch that is disposed in the power transmission path and between the torque converter and the continuously variable transmission. The device control unit may decrease a fastening force of the friction clutch if the discharge pressure of the oil pump falls below the threshold value at the vehicle deceleration.

The control device may further include a hydraulic pressure circuit that is disposed in a hydraulic pressure supply path between the oil pump and the continuously variable transmission and capable of supplying a part of the hydraulic oil discharged from the oil pump to a lubrication system. The device control unit may control the hydraulic circuit in a control mode for restricting a supply amount of the hydraulic oil to the lubrication system if the discharge pressure of the oil pump falls below the threshold value at the vehicle deceleration.

The control mode may be to set a target line pressure of a line pressure passage for supplying the hydraulic oil toward the continuously variable transmission to a maximum value.

The control device may further include an electric pump that is configured to be driven during a vehicle stop where the engine stops and capable of supplying the hydraulic oil to the continuously variable transmission. A maximum discharge output of the electric pump may be lower than a maximum discharge pressure of the oil pump.

The electric motor may include a motor generator that is configured to be controlled to be in a powering state to rotationally drive the engine and in a power generation state to be rotationally driven by the engine.

BRIEF DESCRIPTION OF THE DRAWINGS

FIG. 7A is a schematic diagram illustrating a power transmission path in the power unit during a vehicle deceleration, and FIG. 7B is a schematic diagram illustrating a power transmission path in the power unit immediately before a vehicle stops.

DETAILED DESCRIPTION

Figure 1:
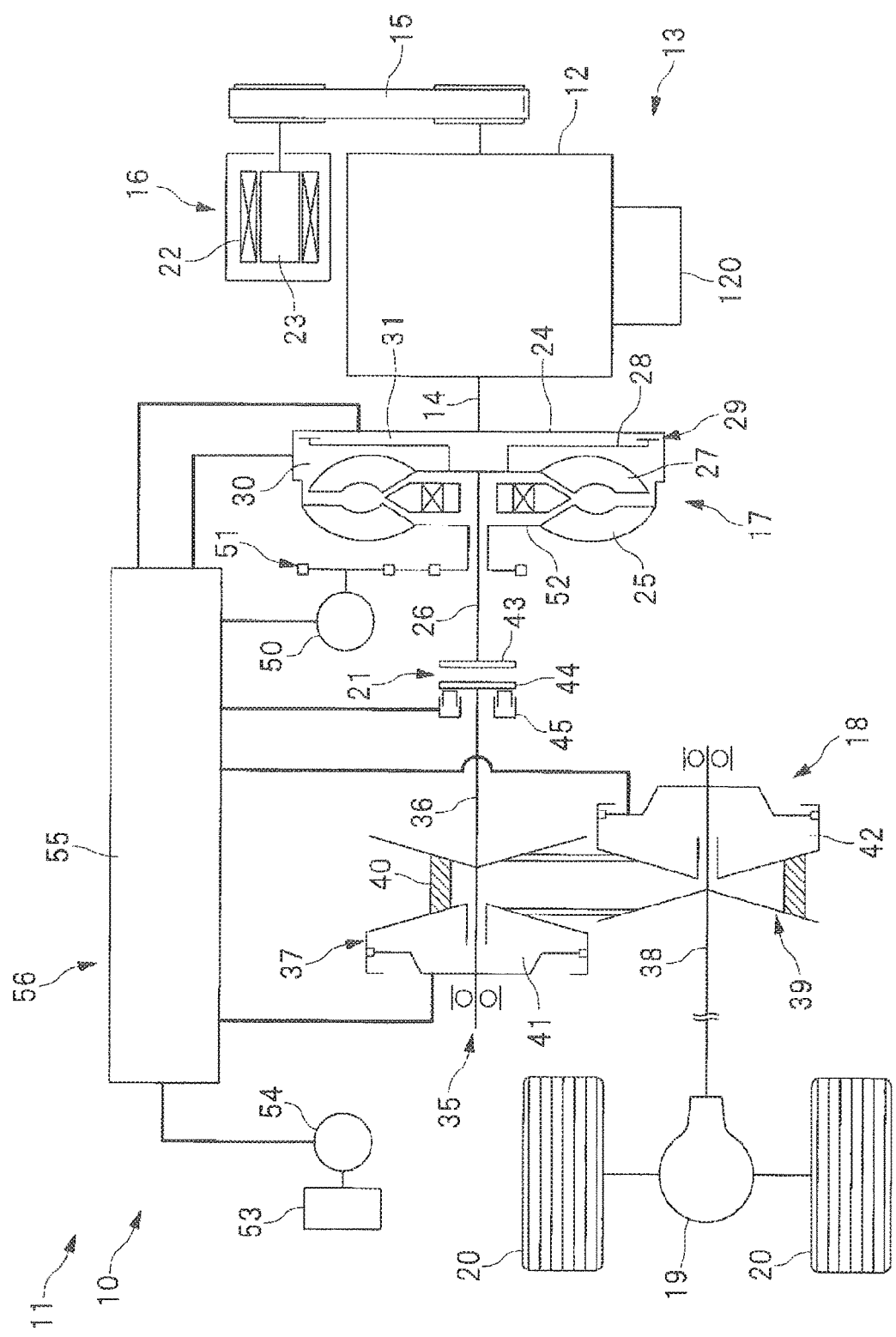
FIG. 1 is a schematic diagram illustrating a configuration example of a vehicle equipped with a control device for a vehicle according to an implementation of the present invention.

Hereinafter, an implementation of the present invention will be described with reference to the accompanying drawings in detail. FIG. 1 is a schematic diagram illustrating a configuration example of a vehicle 11 equipped with a vehicle control device 10 according to an implementation of the present invention. As illustrated in FIG. 1, a power unit 13 having an engine 12 is mounted on a vehicle 11. A starter generator 16 is coupled to a crank shaft 14 of the engine 12 through a belt mechanism 15. The engine 12 is also coupled to a continuously variable transmission 18 through a torque converter 17, and the continuously variable transmission 18 is coupled to wheels 20 through a differential mechanism 19 and so on. Further, a forward clutch 21 is disposed between the torque converter 17 and the continuously variable transmission 18.

[Starter Generator]

The starter generator 16 (electric motor, motor generator) 16 coupled to the engine 12 is a so-called ISG (integrated starter generator) that functions as a generator and an electric motor. The starter generator 16 not only functions as the generator driven by the crank shaft 14 but also functions as the electric motor that rotationally starts up the crank shaft 14 in a so-called idling stop control. The starter generator 16 includes a stator 22 having a stator coil and a rotor 23 having a field coil. An energization state of the stator coil and the field coil is controlled so that the starter generator 16 can be controlled to be in a power generation state or the starter generator 16 can be controlled to be in a powering state.

[Torque Converter]

The torque converter 17 coupled to the engine 12 includes a pump impeller 25 that is coupled to the crank shaft 14 through a front cover 24, and a turbine runner 27 that faces the pump impeller 25 and is coupled with a turbine shaft 26. The torque converter 17 is equipped with a lock-up clutch 29 having a lock-up piston 28. An apply chamber 30 and a release chamber 31 are partitioned with the lock-up piston 28 as a boundary in the torque converter 17. With an increase in a hydraulic pressure of the apply chamber 30 and a decrease in a hydraulic pressure of the release chamber 31, the lock-up piston 28 is pressed against the front cover 24, and the lock-up clutch 29 is switched to an engaged state. On the other hand, with an increase in the hydraulic pressure of the release chamber 31 and a decrease in the hydraulic pressure of the apply chamber 30, the lock-up piston 28 is pulled away from the front cover 24 and the lock-up clutch 29 is switched to a released state.

[Continuously Variable Transmission]

The continuously variable transmission 18 is disposed in a power transmission path 35 between the engine 12 and the wheels 20. The continuously variable transmission 18 includes a primary pulley 37 disposed on a primary shaft 36 and a secondary pulley 39 disposed on a secondary shaft 38. A drive chain 40 is wound on the primary pulley 37 and the secondary pulley 39, and transmits a power between the pulleys 37 and 39. A primary chamber 41 is provided in the primary pulley 37, and adjusts a pulley groove width. A secondary chamber 42 is provided in the secondary pulley 39, and adjusts the pulley groove width. The hydraulic pressure to be supplied to the secondary chamber 42 is controlled so as to adjust a clamping force of the drive chain 40, and adjust a torque capacity of the continuously variable transmission 18. In addition, the hydraulic pressures to be supplied to the primary chamber 41 and the secondary chamber 42 are controlled so as to vary a winding diameter of the drive chain 40 and control a transmission gear ratio of the continuously variable transmission 18.

[Forward Clutch]

The power transmission path 35 is equipped with the forward clutch 21 (friction clutch), and the forward clutch 21 is disposed between the torque converter 17 and the primary pulley 37. The forward clutch 21 includes a clutch plate 43 and a clutch plate 44. The clutch plate 43 is coupled to the turbine shaft 26, and the clutch plate 44 is coupled to the primary shaft 36. The forward clutch 21 includes a hydraulic actuator 45, and the hydraulic oil is supplied to the hydraulic actuator 45. With an increase in the hydraulic pressure in the hydraulic actuator 45, the clutch plates 43 and 44 are engaged with each other, and the forward clutch 21 is switched to the engaged state. On the other hand, with a decrease in the hydraulic pressure in the hydraulic actuator 45, the engagement of the clutch plates 43 and 44 is released, and the forward clutch 21 is switched to the released state. Incidentally, with the adjustment of the hydraulic pressure in the hydraulic actuator 45, the forward clutch 21 can be controlled to be in a slippage state.

[Hydraulic Pressure Control System]

In order to supply the hydraulic oil to the torque converter 17, the continuously variable transmission 18, the forward clutch 21, and so on, the power unit 13 is equipped with a mechanical oil pump (oil pump) 50 driven by the engine 12. The mechanical oil pump 50 (hereinafter referred to as "mechanical pump") is coupled to a pump shell 52 of the torque converter 17 through a chain mechanism 51. In addition, the power unit 13 is equipped with an electric oil pump (electric pump) 54 driven by a pump motor 53 in addition to the mechanical pump 50. The electric oil pump 54 (hereinafter referred to as "electric pump") is driven at the time of stopping the vehicle where the engine 12 stops in order to assist the mechanical pump 50. A maximum discharge pressure of the electric pump 54 is designed to be lower than a maximum discharge pressure of the mechanical pump 50. Further, the power unit 13 is equipped with a valve unit 55 including multiple electromagnetic valves and multiple oil passages. The oil, that is, the hydraulic oil discharged from the mechanical pump 50 or the electric pump 54 is supplied to the torque converter 17, the continuously variable transmission 18, the forward clutch 21, and so on through the valve unit 55. In other words, the valve unit 55 is disposed in a hydraulic pressure supply path 56 between the mechanical pump 50 and the continuously variable transmission 18. The valve unit 55 functions as a hydraulic pressure circuit.

Figure 2:
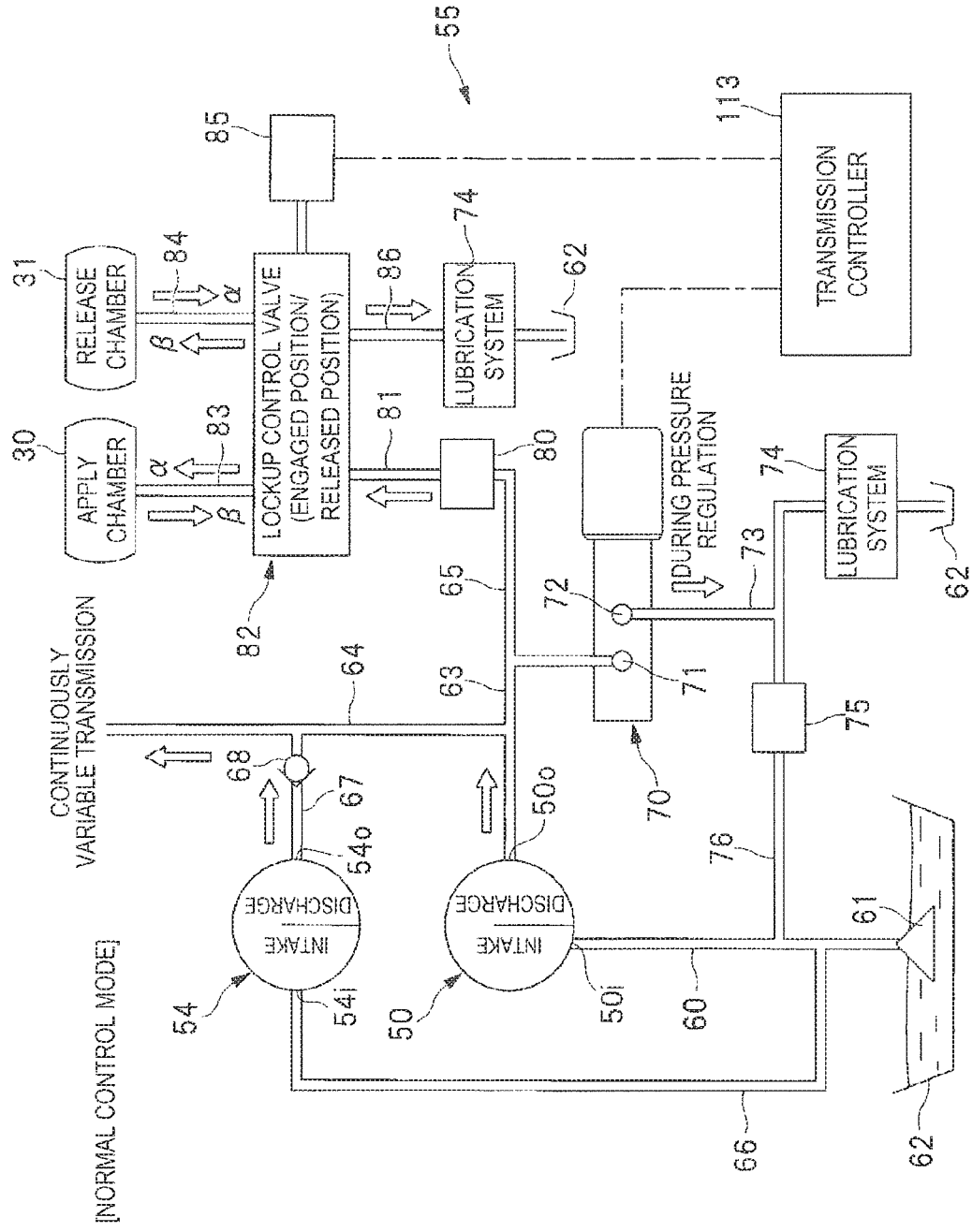
FIG. 2 is a schematic diagram illustrating an example of a valve unit structure.
Figure 9:
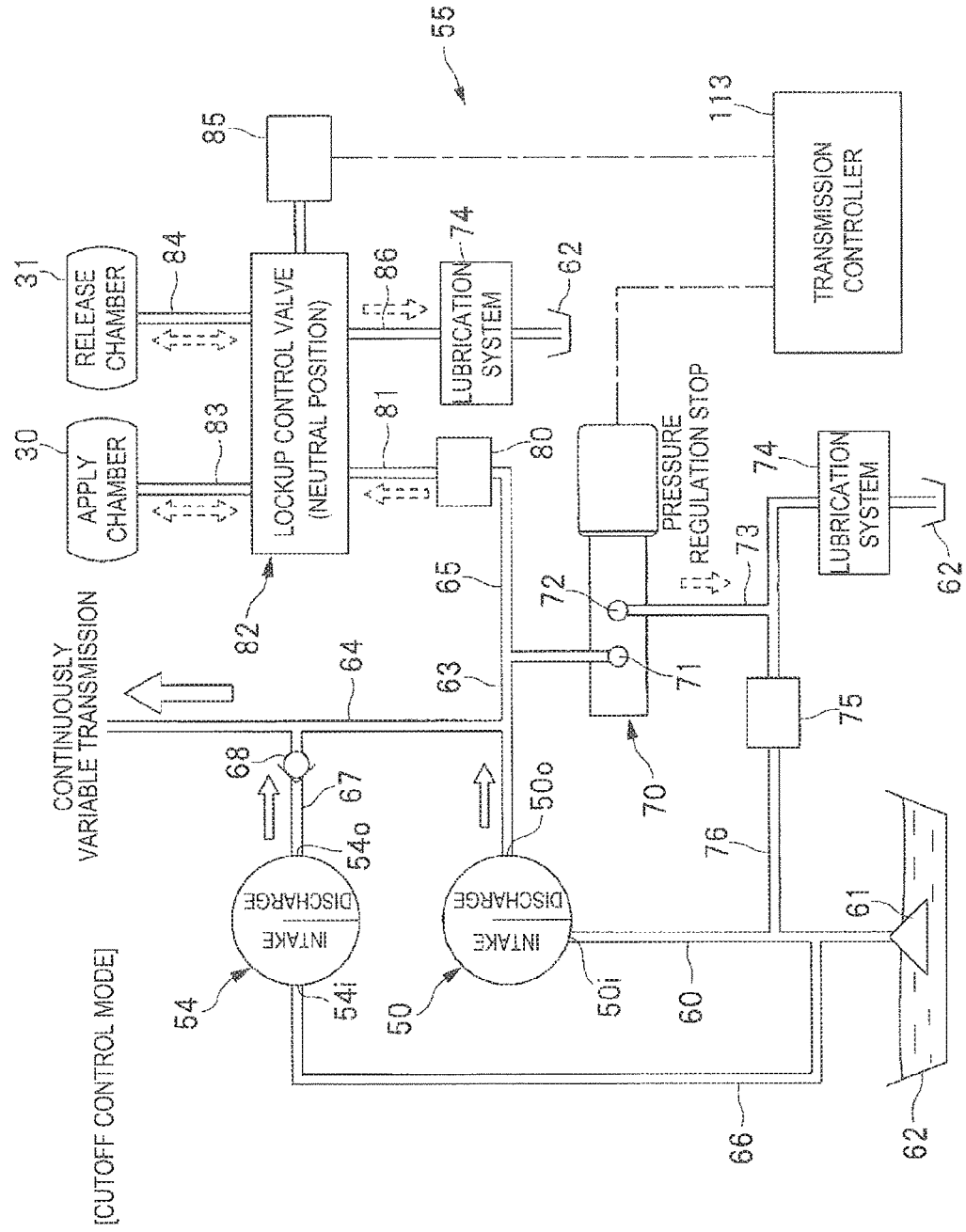
FIG. 9 is a schematic diagram illustrating a valve unit controlled in a cutoff control mode.

Subsequently, a structure of the valve unit 55 will be described. FIG. 2 is a schematic diagram illustrating an example of the valve unit structure. In FIGS. 2 and 9 to be described later, flow directions of the hydraulic oil are indicated by outlined arrows. As illustrated in FIG. 2, an intake port 50i of the mechanical pump 50 is coupled with an intake oil passage 60, and a strainer 61 coupled to the intake oil passage 60 is housed in an oil pan 62. Also, a discharge port 50o of the mechanical pump 50 is coupled with a line pressure passage 63. The line pressure passage 63 is coupled with a branch oil passage 64 that supplies the hydraulic oil toward the continuously variable transmission 18 and so on, and also coupled with a branch oil passage 65 that supplies the hydraulic oil toward the torque converter 17. Also, an intake port 54*i* of the electric pump 54 is coupled with the intake oil passage 60 through an intake oil passage 66. A discharge port 54*o* of the electric pump 54 is coupled with a discharge oil passage 67, and the discharge oil passage 67 is coupled with the branch oil passage 64 through a check valve 68. In this way, the mechanical pump 50 and the electric pump 54 are coupled in parallel with each other.

Also, the line pressure passage 63 is coupled with an introduction port 71 of a line pressure control valve 70. The line pressure control valve 70 includes a pressure reduction port 72, and the pressure reduction port 72 is coupled with a pressure reduction oil passage 73. In order to adjust the hydraulic oil flowing in the line pressure passage 63 to a target line pressure, the line pressure control valve 70 controls a communication state between the introduction port 71 and the pressure reduction port 72. In other words, in reducing the hydraulic pressure in the line pressure passage 63, a communication passage between the introduction port 71 and the pressure reduction port 72 is expanded to increase a hydraulic oil quantity guided from the line pressure passage 63 to the pressure reduction oil passage 73. On the other hand, in increasing the hydraulic pressure in the line pressure passage 63, the communication passage between the introduction port 71 and the pressure reduction port 72 is reduced to decrease the hydraulic oil quantity guided from the line pressure passage 63 to the pressure reduction oil passage 73. The pressure reduction oil passage 73 is coupled with the drive chain 40 and a lubrication system 74 for various clutches, various gears and the like. The hydraulic oil flowing in the pressure reduction oil passage 73 is supplied to the lubrication system 74, and guided to the downstream oil pan 62 after lubricating the lubrication system 74. In this way, in the valve unit 55, a part of the hydraulic oil discharged from the mechanical pump 50 or the like is supplied to the lubrication system 74. Also, the pressure reduction oil passage 73 is coupled with a hydraulic passage 76 through a lubrication pressure regulating valve 75, and the hydraulic passage 76 is coupled with the intake oil passage 60.

The branch oil passage 65 for supplying the hydraulic oil toward the torque converter 17 is coupled with a lockup control valve 82 through a torque converter pressure regulating valve 80 and a supply oil passage 81. Also, the lockup control valve 82 is coupled with the apply chamber 30 through an apply oil passage 83, and coupled with the release chamber 31 through a release oil passage 84. In engaging the lock-up clutch 29, a pilot pressure is supplied to the lockup control valve 82 from a duty control valve 85, and a spool valve shaft not shown of the lockup control valve 82 is controlled to be at the engaged position. The lockup control valve 82 functions as an oil passage switching valve. With the above configuration, as indicated by arrows α in FIG. 2, the hydraulic oil is supplied to the apply chamber 30, the hydraulic oil is discharged from the release chamber 31, and the lock-up clutch 29 is controlled to be in the engaged state. On the other hand, in releasing the lock-up clutch 29, the spool valve shaft of the lockup control valve 82 is controlled to be at the released position by the duty control valve 85. With the above configuration, as indicated by arrows β in FIG. 2, the hydraulic oil is supplied to the release chamber 31 and discharged from the apply chamber 30, and the lock-up clutch 29 is controlled to be in the released state. Incidentally, the hydraulic oil discharged from the apply chamber 30 and the release chamber 31 is supplied to the lubrication system 74 through a discharge oil passage 86.

[Power Supply Circuit]

Figure 3:
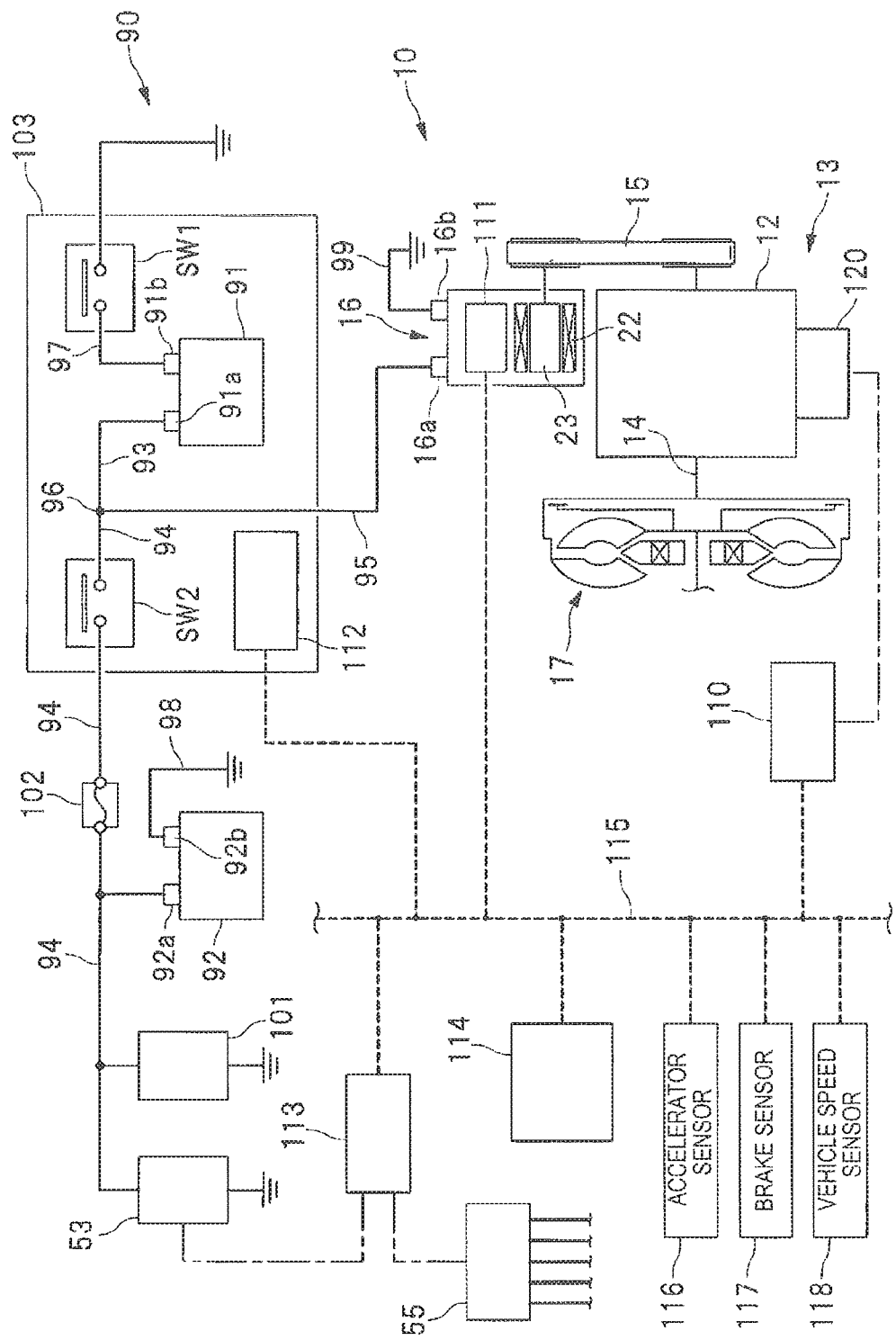
FIG. 3 is a schematic diagram illustrating an example of a power supply circuit and an electronic control system equipped in a power unit.
Figure 4:
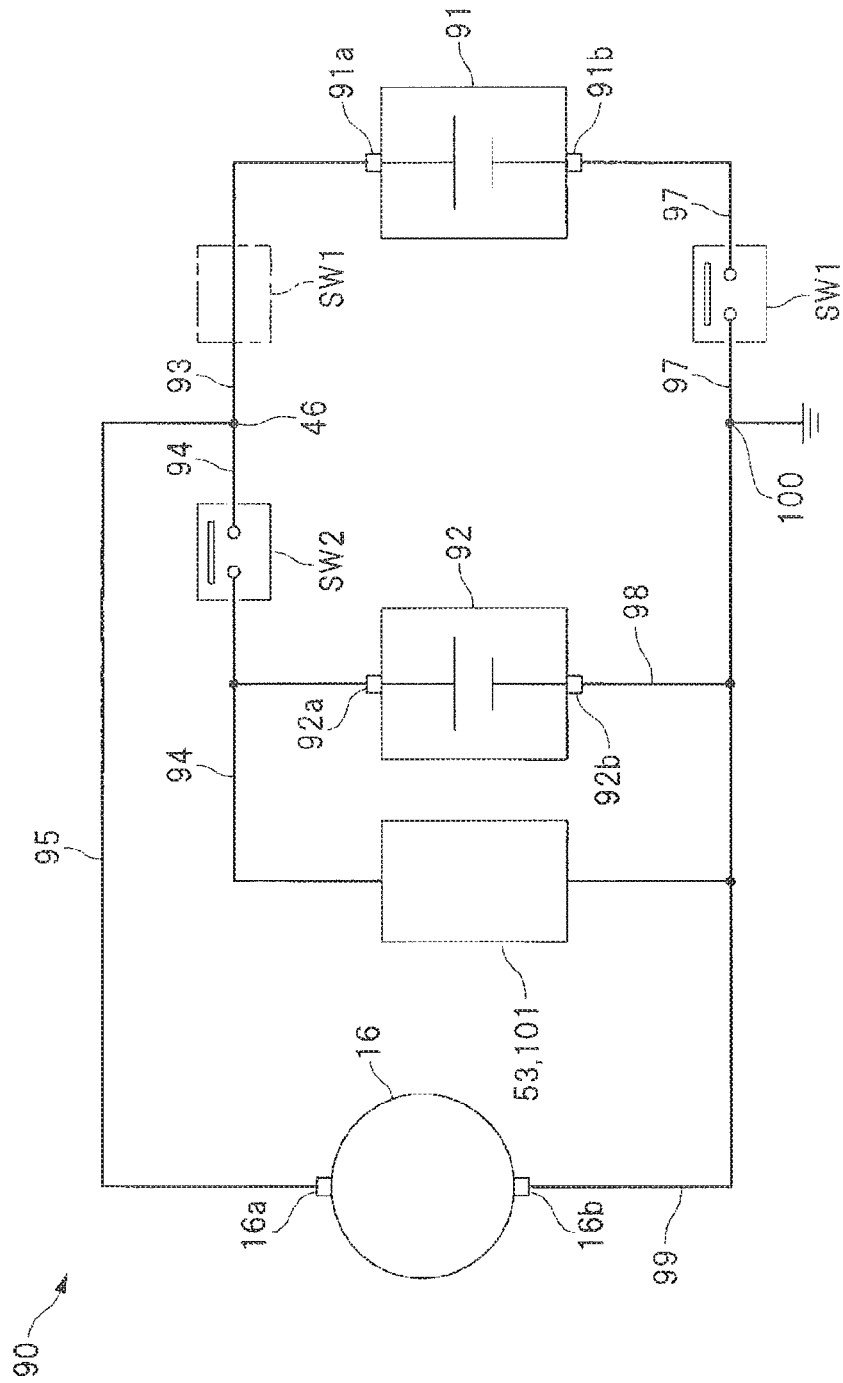
FIG. 4 is a circuit diagram simplifying an example of the power supply circuit.

A power supply circuit 90 that is coupled to the starter generator 16 will be described. FIG. 3 is a schematic diagram illustrating an example of the power supply circuit 90 and an electronic control system disposed in the power unit 13. FIG. 4 is a circuit diagram simplifying an example of the power supply circuit 90. As illustrated in FIGS. 3 and 4, the power supply circuit 90 coupled to the starter generator 16 includes a lithium ion battery 91 and a lead battery 92 coupled in parallel to the lithium ion battery 91. Incidentally, in order to aggressively charge and discharge the lithium ion battery 91, a terminal voltage across the lithium ion battery 91 is designed to be higher than a terminal voltage across the lead battery 92. In addition, in order to aggressively charge and discharge the lithium ion battery 91, an internal resistance of the lithium ion battery 91 is designed to be smaller than an internal resistance of the lead battery 92.

A positive terminal 91*a* of the lithium ion battery 91 is coupled with a positive line 93, a positive terminal 92*a* of the lead battery 92 is coupled with a positive line 94, and a positive terminal 16*a* of the starter generator 16 is coupled with a positive line 95. Those positive lines 93 to 95 are coupled to each other through a connection point 96. Also, a negative terminal 91*b* of the lithium ion battery 91 is coupled with a negative line 97, a negative terminal 92*b* of the lead battery 92 is coupled with a negative line 98, and a negative terminal 16*b* of the starter generator 16 is coupled with a negative line 99. Those negative lines 97 to 99 are coupled with a reference potential point 100.

The negative line 97 coupled to the lithium ion battery 91 is equipped with a switch SW1 that is switched between a conduction state and a cutoff state. In addition, the positive line 94 coupled to the lead battery 92 is equipped with a switch SW2 that is switched between the conduction state and the cutoff state. As illustrated in FIG. 1, the positive line 94 located downstream of the switch SW2 is coupled with an electrical device 101 such as an electric component, and also coupled with a pump motor 53 of the electric pump 54. In addition, the positive line 94 is equipped with a fuse 102 for protecting the electrical device 101, the pump motor 53, and so on. Further, the power supply circuit 90 of the vehicle control device 10 is equipped with a battery module 103 having the lithium ion battery 91 and the switches SW1, SW2.

[Electronic Control System]

The electronic control system for controlling the power unit 13 will be described. As illustrated in FIG. 3, the vehicle control device 10 is equipped with various controllers 110 to 114 each including a computer and so on. The engine controller 110 is provided to control the engine 12, and the ISG controller 111 is provided to control the starter generator 16. Also, the battery controller 112 is provided to control the battery module 103, and the transmission controller 113 is provided to control the continuously variable transmission 18, the lock-up clutch 29, the forward clutch 21, and so on. Further, the main controller 114 is provided to cooperatively control the respective controllers 110 to 113. Those controllers 110 to 114 each include a computer and so on, and are coupled to be communicatable with each other through an in-vehicle network 115 such as a CAN or a LIN. In addition, the in-vehicle network 115 is coupled with an accelerator sensor 116 for detecting an operation situation of an accelerator pedal, a brake sensor 117 for detecting an operation situation of a brake pedal, a vehicle speed sensor 118 for detecting a vehicle speed that is a travel speed of the vehicle 11, and so on. Further, information such as an engine rotation speed, a fuel supply situation, a transmission gear ratio, a power generation situation, a charging state SOC, and so on is transmitted from the various controllers to the in-vehicle network 115.

The engine controller 110 has a function of outputting control signals to engine accessories 120 such as an injector, an ignitor, and a throttle valve to control the engine rotation speed, an engine torque, and so on. Also, the ISG controller 111 includes an inverter, a regulator, a computer, and so on. The ISG controller 111 has a function of controlling an energization state of the field coil and the stator coil, and controlling the starter generator 16 to be in the power generation state or in the powering state. Also, the battery controller 112 has a function of monitoring a charging state SOC, a current, a voltage, a temperature and so on of the lithium ion battery 91, and a function of controlling the switches SW1 and SW2. Further, the transmission controller 113 has a function of outputting the control signal to the valve unit 55, and controlling the operating states of the continuously variable transmission 18, the forward clutch 21, the lock-up clutch 29, and so on. The main controller 114 (device control unit) has a function of setting an operating target of the power unit 13 on the basis of information transmitted from the various sensors and the various controllers, and outputting the control signals to the various controllers 110 to 113 on the basis of the operating target.

[Battery Charging and Discharging Control]

Figure 5A:
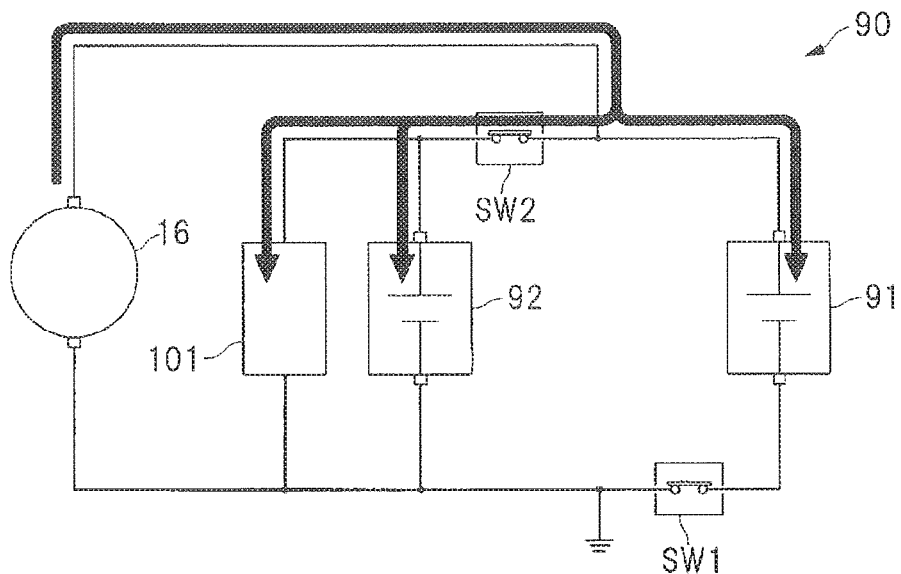
FIG. 5A is a schematic diagram illustrating a power supply situation when a starter generator is controlled to be in a power generation state.
Figure 5B:
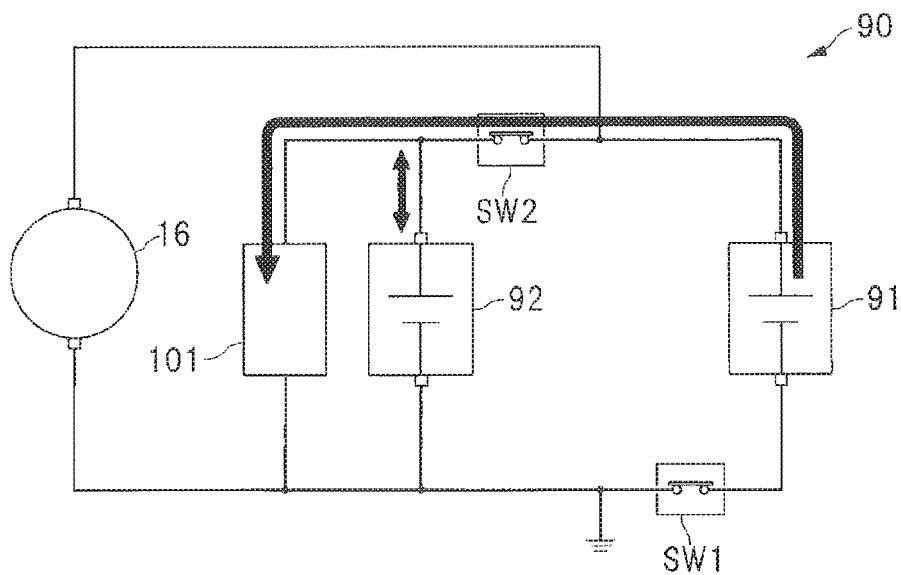
FIG. 5B is a schematic diagram illustrating the power supply situation when the starter generator is controlled to be in a dormant state.

The charging and discharging control of the lithium ion battery 91 will be described. The main controller 114 controls the starter generator 16 to be in the power generation state or in a power generation dormant state on the basis of the charging state SOC of the lithium ion battery 91, to thereby control the charging and discharging operation of the lithium ion battery 91. Incidentally, the charging state SOC (state of charge) is a ratio of a storage amount to a design capacity of the battery. FIG. 5A is a schematic diagram illustrating a power supply situation when the starter generator 16 is controlled to be in the power generation state, and FIG. 5B is a schematic diagram illustrating a power supply situation when the starter generator 16 is controlled to be in the dormant state. Incidentally, the power generation state of the starter generator 16 includes a combustion power generation state in which the starter generator 16 is driven for the power generation by the engine power and a regenerative power generation state in which the starter generator 16 is driven for the power generation at the time of decelerating the vehicle.

If the charging state SOC of the lithium ion battery 91 falls below a predetermined lower limit value, because the lithium ion battery 91 is charged by the starter generator 16, the starter generator 16 is controlled to be in the combustion power generation state. When the starter generator 16 is controlled to be in the combustion power generation state, the power generation voltage of the starter generator 16 is pulled up more than the terminal voltage across the lithium ion battery 91. With the above configuration, because the power is supplied to the lithium ion battery 91, the electrical device 101, the lead battery 92, and so on from the starter generator 16 as indicated by solid arrows in FIG. 5A, the lithium ion battery 91 is charged by the starter generator 16.

On the other hand, if the charging state SOC of the lithium ion battery 91 exceeds a predetermined upper limit value, since the lithium ion battery 91 is urged to be discharged to reduce an engine load, the starter generator 16 is controlled to be in the dormant state, that is, in the power generation dormant state. When the starter generator 16 is controlled to be in the dormant state, the power generation voltage across the starter generator 16 is pulled down more than the terminal voltage across the lithium ion battery 91. As a result, as indicated by solid arrows in FIG. 5B, because the electric power is supplied to the electrical device 101 and so on from the lithium ion battery 91, the power generation of the starter generator 16 can be suppressed, and the engine load can be reduced. Incidentally, when the starter generator 16 is controlled to be in the combustion power generation state or in the dormant state, the switches SW1 and SW2 are held in a conduction state.

As described above, the starter generator 16 is controlled to be in the combustion power generation state or in the dormant state on the basis of the charging state SOC, and from the viewpoint that the fuel combustion performance of the vehicle 11 is improved, the starter generator 16 is controlled to be in the regenerative power generation state at the time of decelerating the vehicle. Whether the regenerative power generation of the starter generator 16 is executed, or not, is determined on the basis of the operation situation of the accelerator pedal or the brake pedal. For example, when the depression of the accelerator pedal is released, or the brake pedal is depressed, the power generation voltage of the starter generator 16 is pulled up more than the terminal voltage across the lithium ion battery 91, and as illustrated in FIG. 5A, the starter generator 16 is controlled to be in the regenerative power generation state.

[Idling Stop Control]

In order to improve the fuel consumption performance of the vehicle 11, the vehicle control device 10 executes an idling stop control for stopping the engine 12 on the basis of a predetermined stop condition and starting the engine 12 on the basis of a predetermined start condition. As the stop condition of the engine 12, for example, the vehicle speed falls below a predetermined value, or the brake pedal is depressed. In addition, as the start condition of the engine 12, for example, the depression of the brake pedal is released, or the accelerator pedal is depressed.

With the execution of the idling stop control described above, when the vehicle 11 is decelerated and stopped, the engine 12 is automatically stopped. However, when the engine 12 is stopped, since the mechanical pump 50 is stopped together with the engine 12, the drive chain 40 of the continuously variable transmission 18 and so on may be slipped with a reduction in the control hydraulic pressure. Under the circumstances, the vehicle control device 10 executes a hydraulic pressure holding control for continuing the operation of the mechanical pump 50 to prevent an excessive drop of the control hydraulic pressure when the engine 12 is stopped under the idling stop control.

[Hydraulic Pressure Holding Control (from Vehicle Deceleration to Vehicle Stop)]

Figure 6:
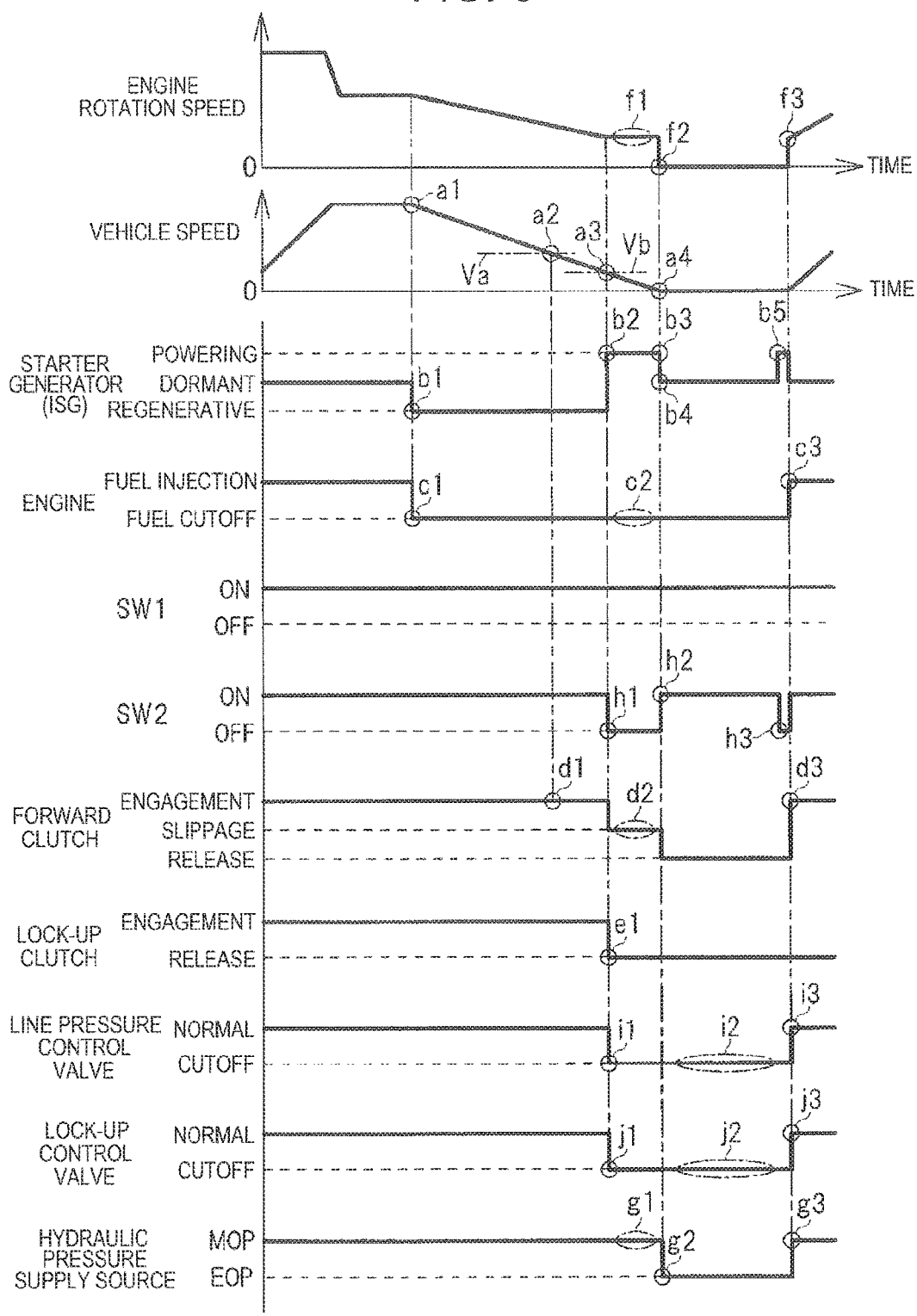
FIG. 6 is a timing chart illustrating an example of an operating state of each section of a power unit in an idling stop control and a hydraulic pressure holding control.

Hereinafter, a description will be given of a hydraulic pressure holding control to be executed by the idling stop control. FIG. 6 is a timing chart illustrating an example of an operating state of each section of a power unit in an idling stop control and a hydraulic pressure holding control. FIG. 6 illustrates a situation in which after the engine 12 has been stopped with the vehicle stop, the engine 12 is restarted to start the vehicle. In FIG. 6, "MOP" described as the hydraulic pressure supply source represents the mechanical pump 50, and "EOP" described as the hydraulic pressure supply source represents the electric pump 54.

As illustrated in FIG. 6, when the vehicle 11 starts to be decelerated (symbol a1), the starter generator 16 is controlled to be in the regenerative power generation state (symbol b1), and the fuel supply to the engine 12 is cut off (symbol c1). Subsequently, if the vehicle speed falls below a predetermined threshold value Va (symbol a2), the hydraulic pressure to be supplied to the forward clutch 21 is reduced, and the fastening force of the forward clutch 21 is reduced (symbol d1). Subsequently, if the vehicle speed falls below a threshold value Vb lower than the threshold value Va (symbol a3), the starter generator 16 is controlled to be in the powering state (symbol b2), and the lock-up clutch 29 is controlled to be in the released state (symbol e1). The powering state of the starter generator 16 is continued until the vehicle stops (symbol b3).

As described above, a situation in which the vehicle speed falls below the threshold value Vb represents a situation in which not only the engine rotation speed but also the rotational speed of the mechanical pump 50 is reduced, which is a situation in which the discharge pressure of the mechanical pump 50 is reduced. Under the circumstances, as described above, when the discharge pressure of the mechanical pump 50 falls below a predetermined threshold value at the time of reducing the vehicle speed where the fuel supply to the engine 12 is cut off, the main controller 114 of the vehicle control device 10 controls the lock-up clutch 29 to be in the released state, and controls the starter generator 16 to be in the powering state. As described above, with the release of the lock-up clutch 29, the continuously variable transmission 18 and the wheels 20 can be decoupled from the engine 12, and a drag torque of the engine 12 can be reduced. With the above configuration, the engine 12 can be motored by the starter generator 16, and the engine rotation speed can be maintained (symbol f1) in a state where a fuel cut to the engine 12 is continued (symbol c2). With the above configuration, a minimum rotational speed of the mechanical pump 50 can be maintained, and the mechanical pump 50 can function as a hydraulic pressure supply source (symbol g1).

As described above, even immediately before a vehicle stops where the rotational speed of the mechanical pump 50 is reduced, because the mechanical pump 50 can be driven by the starter generator 16, the minimum control hydraulic pressure of the continuously variable transmission 18 can be ensured, and the continuously variable transmission 18 can be protected from a slippage such as the drive chain 40. Moreover, since the fuel cut to the engine 12 is continued, the fuel consumption performance of the vehicle 11 can be improved. Also, in the above-mentioned description, since the rotational speed of the mechanical pump 50 is interlocked with the vehicle speed, the main controller 114 estimates the discharge pressure of the mechanical pump 50 on the basis of the vehicle speed. In other words, that the vehicle speed falls below the threshold value Vb represents that a discharge pressure Pmop of the mechanical pump 50 falls below a threshold value Px. Incidentally, the discharge pressure is estimated on the basis of the vehicle speed, but the implementation of the present invention is not limited to the above configuration, and for example, the discharge pressure of the mechanical pump 50 may be estimated on the basis of the engine rotational speed, and the discharge pressure of the mechanical pump 50 may be detected directly or indirectly with the use of a hydraulic pressure sensor.

As described above, because the drag torque of the engine 12 is reduced in motoring the engine 12, the lock-up clutch 29 is controlled to be in the released state. However, in order to downsize the starter generator 16, it is desirable to further reduce the drag torque of the engine 12. Under the circumstances, as described above, the fastening force of the forward clutch 21, that is, the torque capacity is reduced in motoring the engine 12. As a result, in motoring the engine 12, the forward clutch 21 can be slipped as the need arises, and the drag torque of the engine 12 can be restricted. With the above configuration, even with the starter generator 16 small in a rated output, the engine 12 is motored so as to drive the mechanical pump 50.

FIG. 7A is a schematic diagram illustrating a power transmission path in the power unit 13 during a vehicle deceleration, and FIG. 7B is a schematic diagram illustrating a power transmission path in the power unit 13 immediately before a vehicle stops. In FIGS. 7A and 7B, power transmission paths are indicated by solid arrows. As illustrated in FIG. 7A, during the vehicle deceleration where the vehicle speed exceeds the threshold value Vb, because the sufficient power is transmitted to the engine 12 from the wheels 20, the starter generator 16 regeneratively generates the power by the aid of the power from the wheels 20, and the mechanical pump 50 is rotationally driven by the power from the wheels 20. As described above, during the vehicle deceleration, the mechanical pump 50 can be sufficiently driven by the power from the wheels 20, and the continuously variable transmission 18 can be appropriately controlled. Incidentally, as illustrated in FIG. 7A, the lock-up clutch 29 and the forward clutch 21 are held in the engaged state.

On the other hand, as illustrated in FIG. 7B, immediately before the vehicle stop where the vehicle speed falls below the threshold value Vb, because the power input from the wheels 20 is reduced, it is difficult to sufficiently drive the mechanical pump 50 by the aid of the power from the wheels 20. For that reason, the lock-up clutch 29 is controlled to be in the released state, and the starter generator 16 is controlled to be in the powering state. As described above, with the release of the lock-up clutch 29, the continuously variable transmission 18 and the wheels 20 can be decoupled from the engine 12, and a drag torque of the engine 12 can be reduced. As a result, the engine 12 can be motored by the starter generator 16, and the mechanical pump 50 can be driven by the power of the starter generator 16. With the driving of the mechanical pump 50 by the above method, the minimum control hydraulic pressure of the continuously variable transmission 18 can be ensured, and the continuously variable transmission 18 can be protected from the slippage of the drive chain 40 or the like.

Figure 8:
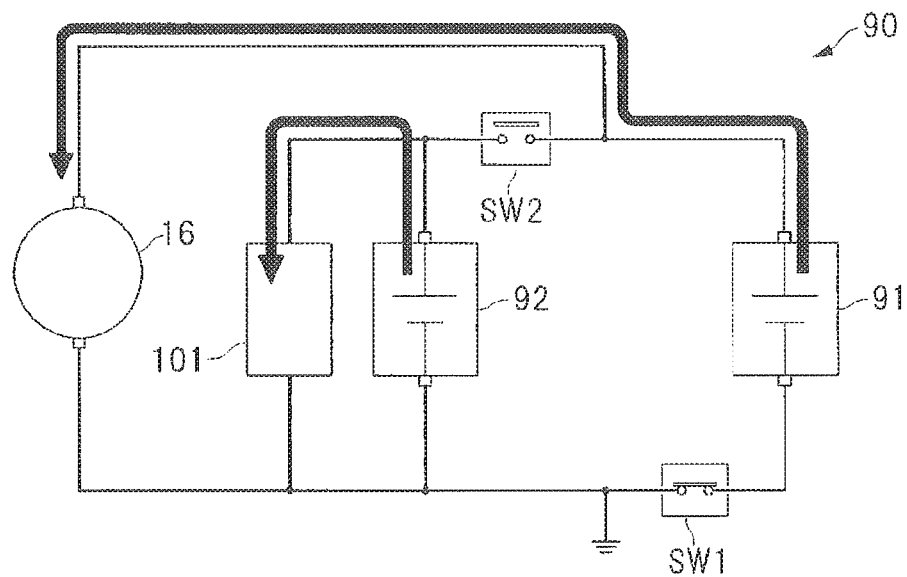
FIG. 8 is a schematic diagram illustrating a power supply situation when a switch is switched to a cutoff state.

Incidentally, as illustrated in FIG. 6, in motoring the engine 12 by the starter generator 16, the switch SW2 is switched from the conduction state to the cutoff state (symbol h1). As a result, in motoring the engine 12, an instantaneous voltage drop, that is, a voltage sag in the electrical device 101 or the like can be prevented, and the engine 12 can be motored without giving discomfort to an occupant FIG. 8 is a schematic diagram illustrating a power supply situation when a switch SW2 is switched to a cutoff state. As illustrated in FIG. 8, when the switch SW2 is turned off, the power supply circuit 90 can be decoupled from the power supply circuit 90. The power supply circuit 90 includes the lead battery 92, the electrical device 101, and so on, and the power supply circuit 90 includes the lithium ion battery 91, the starter generator 16, and so on. With the above configuration, in motoring the engine 12, even when a large current is supplied to the starter generator 16, the voltage sag of the electrical device 101 or the like can be prevented.

[Hydraulic Pressure Holding Control (Cutoff Control Mode)]

Subsequently, a description will be given of a cutoff control mode that is one of the control modes involved in the valve unit 55. The valve unit 55 also functions as a hydraulic pressure circuit. As illustrated in FIG. 6, when the vehicle speed falls below the threshold value Vb, the line pressure control valve 70 is controlled by the cutoff control mode (symbol i1), and the lockup control valve 82 is controlled by the cutoff control mode (symbol j1). FIG. 9 is a schematic diagram illustrating a valve unit 55 controlled in a cutoff control mode. In FIG. 9, broken arrows represent that no hydraulic oil flows.

The control modes of the valve unit 55 include a normal control mode illustrated in FIG. 2 and a cutoff control mode illustrated in FIG. 9. In this example, the normal control mode is a control mode for supplying the hydraulic oil discharged when regulating various control hydraulic pressures to the lubrication system 74, that is, a control mode for not restricting the supply amount of the hydraulic oil in the lubrication system 74. On the other hand, the cutoff control mode is a control mode in which an oil passage toward the lubrication system 74 is cut off to restrict the supply amount of the hydraulic oil to the lubrication system 74. In other words, with the control of the valve unit 55 by the cutoff control mode, because the amount of hydraulic oil to be supplied from the valve unit 55 to the lubrication system 74, that is, the amount of hydraulic oil discharged from the valve unit 55 can be restricted, a larger amount of hydraulic oil can be supplied to the continuously variable transmission 18.

As illustrated in FIG. 9, when the line pressure control valve 70 is controlled in the cutoff control mode, a target line pressure of the line pressure control valve 70 is set to a maximum value, and the pressure regulation by the line pressure control valve 70 is stopped. In other words, the cutoff control mode is provided to set the target line pressure of the line pressure passage 63 for supplying the hydraulic oil toward the continuously variable transmission 18 to a maximum value. As described above, the line pressure control valve 70 is controlled in the cutoff control mode with the results that a communication passage between the introduction port 71 and the pressure reduction port 72 is cut off, and the hydraulic oil is prohibited from flowing into the pressure reduction oil passage 73 from the line pressure passage 63. With the above configuration, because the amount of hydraulic oil flowing toward the lubrication system 74 through the line pressure control valve 70 can be restricted, even when the mechanical pump 50 is driven by motoring the engine 12, a larger amount of hydraulic oil can be supplied to the continuously variable transmission 18, and the minimum control hydraulic pressure of the continuously variable transmission 18 can be ensured.

Also, when the lockup control valve 82 is controlled in the cutoff control mode, a spool valve shaft of the lockup control valve 82 is controlled to be at a neutral position. The neutral position of the spool valve shaft represents a stop position at which the supply oil passage 81, the discharge oil passage 86, the apply oil passage 83, and the release oil passage 84 are cut off from each other. In other words, when the lockup control valve 82 is controlled in the cutoff control mode, whereby the spool valve shaft is held at the neutral position, the hydraulic oil is prohibited from flowing into the apply oil passage 83 and the release oil passage 84 from the supply oil passage 81, and the hydraulic oil is prohibited from flowing into the discharge oil passage 86 from the apply oil passage 83 and the release oil passage 84. As a result, because the amount of hydraulic oil flowing toward the lubrication system 74 through the lockup control valve 82 can be restricted, even when the mechanical pump 50 is driven by motoring the engine 12, a larger amount of hydraulic oil can be supplied to the continuously variable transmission 18, and the minimum control hydraulic pressure of the continuously variable transmission 18 can be ensured. Incidentally, as described above, in motoring the engine 12, the lock-up clutch 29 is switched to the released state. For that reason, in the cutoff control mode, the spool valve shaft of the lockup control valve 82 is controlled to be at the neutral position after having been placed at the released position under control.

[Hydraulic Pressure Holding Control (from Vehicle Stop to Vehicle Start)]

As illustrated in FIG. 6, when the vehicle 11 stops (symbol a4), the starter generator 16 is controlled to be in the dormant state (symbol b4), and the engine 12 is stopped (symbol f2) In addition, the switch SW2 is switched to the conduction state (symbol h2), and the electric pump 54 is driven (symbol g2). As described above, during the vehicle stop where the engine 12 stops, because the electric pump 54 is driven instead of the mechanical pump 50, the hydraulic oil is supplied to the valve unit 55 from the electric pump 54. In other words, in order to maintain a filled state of the hydraulic oil to respective hydraulic chambers of the continuously variable transmission 18 and the forward clutch 21, the hydraulic oil is supplied from the electric pump 54 to the valve unit 55. As a result, because the forward clutch 21 and the continuously variable transmission 18 can be quickly actuated, a response when restarting the vehicle 11 can be improved.

In addition, during the vehicle stop, since the continuously variable transmission 18, the forward clutch 21, and so on are stopped, an amount of hydraulic oil required by the continuously variable transmission 18 the forward clutch 21 is small. For that reason, a small-sized electric pump 54 can be employed. Moreover, during the vehicle stop, because the hydraulic oil discharged from the electric pump 54 is collected into the continuously variable transmission 18, the forward clutch 21, and so on, the line pressure control valve 70 and the lockup control valve 82 are controlled in the cutoff control mode (symbols i2, j2). From the above viewpoint, the discharge pressure required for the electric pump 54 can be suppressed, and the electric pump 54 small in size and low in the costs can be employed.

Subsequently, when the start condition of the engine 12 is established, for example, when the depression of the brake pedal is released, the switch SW2 is switched to the cutoff state (symbol h3), the starter generator 16 is controlled to be in the powering state (symbol b5), and a fuel injection of the engine 12 is restarted (symbol c3). When the engine 12 is restarted (symbol f3), because the mechanical pump 50 is driven by the engine 12, the hydraulic pressure supply source shifts from the electric pump 54 to the mechanical pump 50 (symbol g3). Then, the forward clutch 21 is switched to the engaged state (symbol d3), and the line pressure control valve 70 and the lockup control valve 82 are controlled in the normal control mode (symbols i3, j3).

[Hydraulic Pressure Holding Control (Flowchart)]

Figure 10:
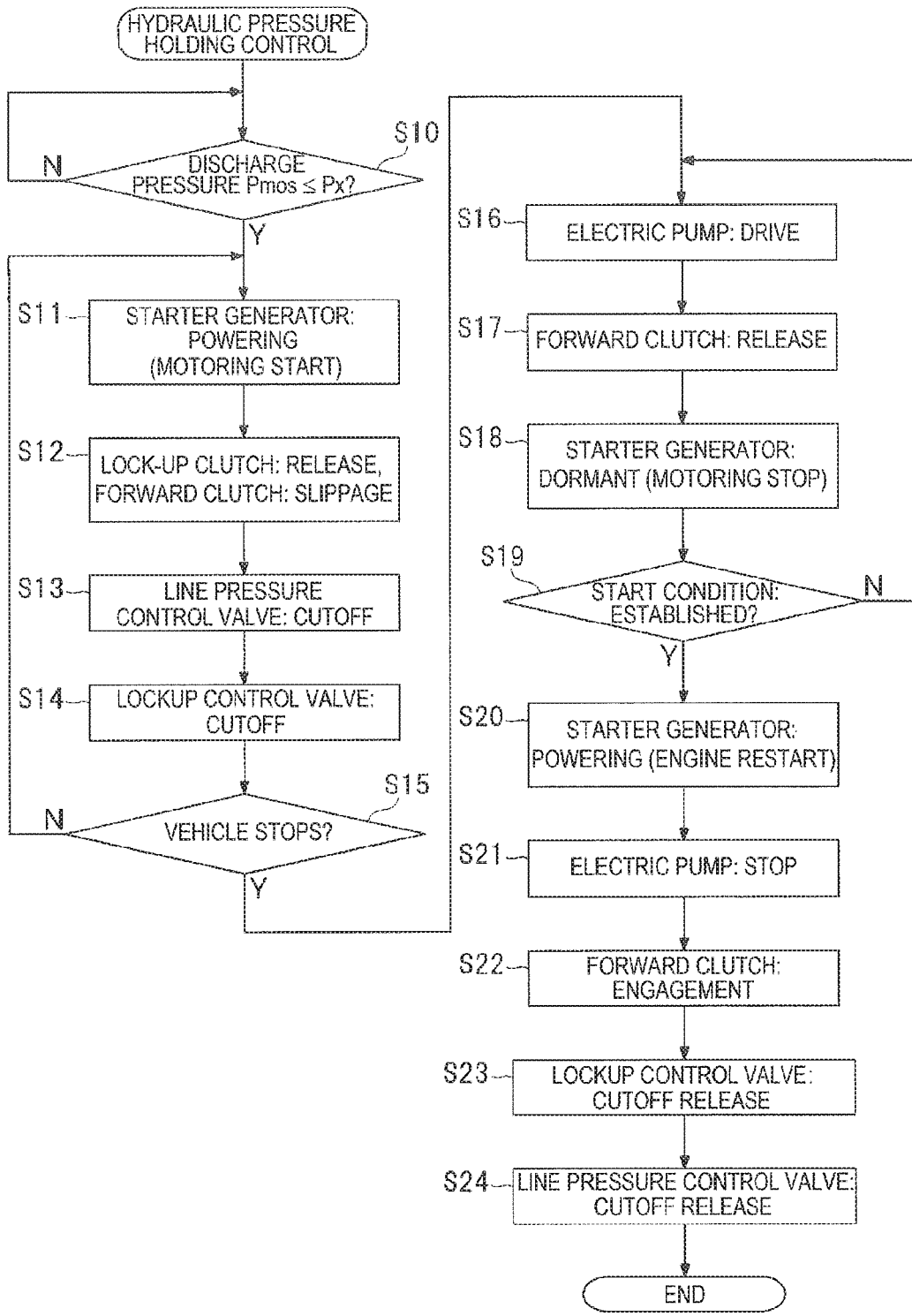
FIG. 10 is a flowchart illustrating an example of an execution procedure of the hydraulic pressure holding control.

Subsequently, the hydraulic pressure holding control described above will be described with reference to a flowchart. FIG. 10 is a flowchart illustrating an example of an execution procedure of the hydraulic pressure holding control. The flowchart illustrated in FIG. 10 is executed at the time of decelerating the vehicle where the depression of the accelerator pedal is released, or at the time of decelerating the vehicle where the brake pedal is depressed.

As illustrated in FIG. 10, in Step S10, it is determined whether the discharge pressure Pmop of the mechanical pump 50 is equal to or less than a predetermined threshold value Px, or not. In Step S10, if it is determined that the discharge pressure Pmop is equal to or less than the threshold value Px, the control proceeds to Step S11, and the starter generator 16 is controlled to be in the powering state.

The control proceeds to Step S12, the lock-up clutch 29 is controlled to be in the released state, and the forward clutch 21 is controlled to be in the slippage state. In subsequent Step S13, the control mode of the line pressure control valve 70 is switched from the normal control mode to the cutoff control mode, and in Step S14, the control mode of the lockup control valve 82 is switched from the normal control mode to the cutoff control mode. With the above configuration, even immediately before a vehicle stops where the rotational speed of the mechanical pump 50 is reduced, because the mechanical pump 50 can be driven by the starter generator 16, the minimum control hydraulic pressure of the continuously variable transmission 18 can be ensured, and the continuously variable transmission 18 can be protected from the slippage of the drive chain 40 and so on.

Subsequently, in Step S15, it is determined whether the vehicle 11 stops, or not. If it is determined that the vehicle 11 stops in Step S15, the control proceeds to Step S16, and the electric pump 54 starts to be driven. In Step S17, the forward clutch 21 is controlled to be in the released state, and in Step S18, the starter generator 16 is controlled to be in the dormant state. As described above, since the electric pump 54 is driven at the time of stopping the vehicle, the filled state of the hydraulic oil to the respective hydraulic chambers of the continuously variable transmission 18 and the forward clutch 21 can be maintained, and the response when restarting the vehicle 11 can be improved.

Subsequently, in Step S19, it is determined whether a start condition of the engine 12 is established, or not. In Step S19, if it is determined that the start condition is established, the control proceeds to Step S20, the starter generator 16 is controlled to be in the powering state, and the engine 12 is restarted. With the above configuration, because the mechanical pump 50 is driven by the engine 12, the hydraulic pressure supply source shifts from the electric pump 54 to the mechanical pump 50. Then, in Step S21, the electric pump 54 is stopped, and in Step S22, the forward clutch 21 is controlled to be in the engaged state. In addition, in subsequent Step S23, the control mode of the lockup control valve 82 is switched from the cutoff control mode to the normal control mode, and in Step S24, the control mode of the line pressure control valve 70 is switched from the cutoff control mode to the normal control mode.

the implementation of the present invention is not limited to the above-mentioned example, but can be modified in various forms without departing from the gist of the implementation of the present invention. In the above description, the starter generator 16 is employed as the electric motor, and the implementation of the present invention is not limited to this configuration, but the electric motor not functioning as a power generator may be employed, and a motor generator that is a power source of a hybrid vehicle as the electric motor may be employed. In addition, in the above description, as the friction clutch, the forward clutch 21 hydraulically controlled is employed, but not limited to the above configuration, and for example, a friction clutch controlled by an electric actuator may be employed. Incidentally, as the friction clutch, a multi-disc clutch may be employed, or a single-disc clutch may be employed.

In the above description, the vehicle control device 10 has the electric pump 54 driven during the vehicle stop, but the implementation of the present invention is not limited to this configuration, and the electric pump 54 may be deleted from the vehicle control device 10. In other words, with the driving of the electric pump 54 during the vehicle stop, the state in which the continuously variable transmission 18 and so on are filled with the hydraulic oil is maintained, but the filled state with the hydraulic oil may be maintained with the use of an accumulator instead of the electric pump 54. In the above description, the line pressure control valve 70 and the lockup control valve 82 are controlled in the cutoff control mode, but the implementation of the present invention is not limited to this configuration, but another electromagnetic valve may be controlled in the cutoff control mode. Incidentally, the circuit structure of the valve unit 55 is not limited to the example illustrated in FIG. 2, but may include another circuit structure.

In the above description, in motoring the engine 12, the lock-up clutch 29 is controlled to be in the released state, and the starter generator 16 is controlled to be in the powering state. In this situation, any control order may be applied. In other words, in motoring the engine 12, since a release control of the lock-up clutch 29 starts, the powering control of the starter generator 16 may be started. In addition, in motoring the engine 12, since the powering control of the starter generator 16 is started, the release control of the lock-up clutch 29 may be started. In addition, in motoring the engine 12, the powering control of the starter generator 16 and the release control of the lock-up clutch 29 may be started at the same timing.

In the above description, in motoring the engine 12, the forward clutch 21 is controlled to be in the slippage state, but the implementation of the present invention is not limited to this configuration, and if an output of the starter generator 16 is sufficient, the forward clutch 21 may be held in the engaged state. Also, in the above description, the forward clutch 21 is controlled to be in the released state at the time of stopping the vehicle, but the implementation of the present invention is not limited to this configuration, and the forward clutch 21 may be held in the engaged state. Incidentally, even when the forward clutch 21 is released at the time of stopping the vehicle, from the viewpoint of improving the response at the time of starting the vehicle, the hydraulic chamber of the forward clutch 21 is filled with the hydraulic oil. In addition, in the above description, the electric pump 54 is driven at the time of stopping the vehicle, and the electric pump 54 is stopped at the time of restarting the engine 12, but the implementation of the present invention is not limited to this configuration. For example, the electric pump 54 may be driven during the vehicle deceleration, or the electric pump 54 may be stopped after the vehicle starts.

Incidentally, the power supply circuit 90 coupled to the starter generator 16 is not limited to the illustrated power supply circuit 90. For example, the illustrated power supply circuit 90 is equipped with the lithium ion battery 91 and the lead battery 92, but the implementation of the present invention is not limited to this configuration. A power supply circuit 90 having one storage capacitor may be employed. In addition, in the illustrated example, the negative line 97 of the lithium ion battery 91 is equipped with the switch SW1, but the implementation of the present invention is not limited to this configuration. For example, as indicated by alternate long and short dash lines in FIG. 2, the positive line 93 of the lithium ion battery 91 may be equipped with the switch SW1.

According to the implementation of the present invention, the device control unit controls the lock-up clutch to put into the released state and controls the electric motor to put into the powering state to rotate the engine to which the fuel supply is cut off to drive the oil pump. Therefore, it is possible to drive the oil pump while the engine is rotated with the fuel supply to the engine being cut off, and thus it is possible to protect the continuously variable transmission while improving a fuel consumption performance of a vehicle.

The invention claimed is:

1. A control device for a vehicle, the vehicle comprising a continuously variable transmission in a power transmission path between an engine and wheels, the control device comprising:
 a lock-up clutch that is disposed in a torque converter coupled to the engine and switchable between an engaged state and a released state;
 an oil pump that is configured to be driven by the engine and to supply a hydraulic oil to the continuously variable transmission;
 an electric motor that is coupled to the engine and configured to be controlled to be in a powering state in which the engine is rotationally driven; and
 a device control unit that is capable of controlling the lock-up clutch to put into the released state and controlling the electric motor to put into the powering state if a discharge pressure of the oil pump falls below a threshold value at a vehicle deceleration in which a fuel supply to the engine is cut off,
 wherein the device control unit is capable of controlling the lock-up clutch to put into the released state, and
 wherein the device control unit is configured to control the electric motor such that, when the fuel supply is cut off to the engine, the electric motor is put into the powering state to rotate the engine to drive the oil pump.

2. The control device for a vehicle according to claim 1, wherein the device control unit continuously puts the electric motor into the powering state until a vehicle stops if the discharge pressure of the oil pump falls below the threshold value at the vehicle deceleration.

3. The control device for a vehicle according to claim 1, the control device further comprising:
 a friction clutch that is disposed in the power transmission path and between the torque converter and the continuously variable transmission,
 wherein the device control unit decreases a fastening force of the friction clutch if the discharge pressure of the oil pump falls below the threshold value at the vehicle deceleration.

4. The control device for a vehicle according to claim 2, the control device further comprising:
 a friction clutch that is disposed in the power transmission path and between the torque converter and the continuously variable transmission,
 wherein the device control unit decreases a fastening force of the friction clutch if the discharge pressure of the oil pump falls below the threshold value at the vehicle deceleration.

5. The control device for a vehicle according to claim 1, the control device further comprising a hydraulic pressure circuit that is disposed in a hydraulic pressure supply path between the oil pump and the continuously variable transmission and capable of supplying a part of the hydraulic oil discharged from the oil pump to a lubrication system,
 wherein the device control unit controls the hydraulic circuit in a control mode for restricting a supply amount of the hydraulic oil to the lubrication system if the discharge pressure of the oil pump falls below the threshold value at the vehicle deceleration.

6. The control device for a vehicle according to claim 2, the control device further comprising a hydraulic pressure circuit that is disposed in a hydraulic pressure supply path between the oil pump and the continuously variable transmission and capable of supplying a part of the hydraulic oil discharged from the oil pump to a lubrication system,
 wherein the device control unit controls the hydraulic circuit in a control mode for restricting a supply amount of the hydraulic oil to the lubrication system if the discharge pressure of the oil pump falls below the threshold value at the vehicle deceleration.

7. The control device for a vehicle according to claim 3, the control device further comprising a hydraulic pressure circuit that is disposed in a hydraulic pressure supply path between the oil pump and the continuously variable transmission and capable of supplying a part of the hydraulic oil discharged from the oil pump to a lubrication system,
 wherein the device control unit controls the hydraulic circuit in a control mode for restricting a supply amount of the hydraulic oil to the lubrication system if the discharge pressure of the oil pump falls below the threshold value at the vehicle deceleration.

8. The control device for a vehicle according to claim 4, the control device further comprising a hydraulic pressure circuit that is disposed in a hydraulic pressure supply path between the oil pump and the continuously variable transmission and capable of supplying a part of the hydraulic oil discharged from the oil pump to a lubrication system,
 wherein the device control unit controls the hydraulic circuit in a control mode for restricting a supply amount of the hydraulic oil to the lubrication system if the discharge pressure of the oil pump falls below the threshold value at the vehicle deceleration.

9. The control device for a vehicle according to claim 5, wherein the control mode is to set a target line pressure of a line pressure passage for supplying the hydraulic oil toward the continuously variable transmission to a maximum value.

10. The control device for a vehicle according to claim 6, wherein the control mode is to set a target line pressure of a line pressure passage for supplying the hydraulic oil toward the continuously variable transmission to a maximum value.

11. The control device for a vehicle according to claim 1, the control device further comprising:
 an electric pump that is configured to be driven during a vehicle stop where the engine stops and capable of supplying the hydraulic oil to the continuously variable transmission,
 wherein a maximum discharge output of the electric pump is lower than a maximum discharge pressure of the oil pump.

12. The control device for a vehicle according to claim 2, the control device further comprising:
 an electric pump that is configured to be driven during a vehicle stop where the engine stops and capable of supplying the hydraulic oil to the continuously variable transmission,
 wherein a maximum discharge output of the electric pump is lower than a maximum discharge pressure of the oil pump.

13. The control device for a vehicle according to claim 3, the control device further comprising:
 an electric pump that is configured to be driven during a vehicle stop where the engine stops and capable of supplying the hydraulic oil to the continuously variable transmission,
 wherein a maximum discharge output of the electric pump is lower than a maximum discharge pressure of the oil pump.

14. The control device for a vehicle according to claim 4, the control device further comprising:
- an electric pump that is configured to be driven during a vehicle stop where the engine stops and capable of supplying the hydraulic oil to the continuously variable transmission,
- wherein a maximum discharge output of the electric pump is lower than a maximum discharge pressure of the oil pump.

15. The control device for a vehicle according to claim 1, wherein the electric motor comprises a motor generator that is configured to be controlled to be in the powering state to rotationally drive the engine and in a power generation state to be rotationally driven by the engine.

16. The control device for a vehicle according to claim 2, wherein the electric motor comprises a motor generator that is configured to be controlled to be in the powering state to rotationally drive the engine and in a power generation state to be rotationally driven by the engine.

17. The control device for a vehicle according to claim 3, wherein the electric motor comprises a motor generator that is configured to be controlled to be in the powering state to rotationally drive the engine and in a power generation state to be rotationally driven by the engine.

18. The control device for a vehicle according to claim 4, wherein the electric motor comprises a motor generator that is configured to be controlled to be in the powering state to rotationally drive the engine and in a power generation state to be rotationally driven by the engine.

\* \* \* \* \*